(12) United States Patent
Shapiro et al.

(10) Patent No.: US 9,377,852 B1
(45) Date of Patent: Jun. 28, 2016

(54) EYE TRACKING AS A METHOD TO IMPROVE THE USER INTERFACE

(71) Applicant: Rockwell Collins, Inc., Cedar Rapids, IA (US)

(72) Inventors: Geoffrey A. Shapiro, Cedar Rapids, IA (US); Nicholas M. Lorch, North Liberty, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 64 days.

(21) Appl. No.: 14/013,883

(22) Filed: Aug. 29, 2013

(51) Int. Cl.
*G06F 3/01* (2006.01)
*G06F 3/0484* (2013.01)
*G06F 3/0482* (2013.01)
*G02B 27/01* (2006.01)

(52) U.S. Cl.
CPC .............. *G06F 3/013* (2013.01); *G02B 27/01* (2013.01); *G06F 3/017* (2013.01); *G06F 3/0482* (2013.01); *G06F 3/04842* (2013.01)

(58) Field of Classification Search
CPC ............ G02B 27/017; G02B 27/0172; G02B 2027/0178; G02B 27/01; G06F 3/0482; G06F 3/04842; G06F 3/013; G06F 3/017
USPC ................................................. 345/7, 8, 156
See application file for complete search history.

(56) References Cited

U.S. PATENT DOCUMENTS

| 4,028,725 | A | * | 6/1977 | Lewis | 348/115 |
|---|---|---|---|---|---|
| 4,725,959 | A | | 2/1988 | Nagata | |
| 5,818,423 | A | | 10/1998 | Pugliese et al. | |
| 5,926,790 | A | | 7/1999 | Wright | |
| 5,974,384 | A | | 10/1999 | Yasuda | |
| 6,173,192 | B1 | | 1/2001 | Clark | |
| 6,571,166 | B1 | * | 5/2003 | Johnson et al. | 701/120 |
| 7,089,108 | B2 | | 8/2006 | Merritt | |
| 7,415,326 | B2 | | 8/2008 | Komer et al. | |
| 7,606,715 | B1 | | 10/2009 | Krenz | |
| 7,809,405 | B1 | | 10/2010 | Rand et al. | |
| 7,881,832 | B2 | | 2/2011 | Komer et al. | |
| 7,912,592 | B2 | | 3/2011 | Komer et al. | |
| 7,967,439 | B2 | * | 6/2011 | Shelhamer et al. | 351/209 |
| 8,139,025 | B1 | | 3/2012 | Krenz | |
| 8,234,121 | B1 | | 7/2012 | Swearingen | |
| 8,311,827 | B2 | | 11/2012 | Hernandez et al. | |
| 8,405,610 | B1 | * | 3/2013 | Cole | 345/158 |
| 8,515,763 | B2 | | 8/2013 | Dong et al. | |
| 2003/0110028 | A1 | | 6/2003 | Bush | |
| 2005/0203700 | A1 | | 9/2005 | Merritt | |
| 2007/0288242 | A1 | | 12/2007 | Spengler et al. | |
| 2008/0065275 | A1 | | 3/2008 | Vizzini | |
| 2009/0303082 | A1 | * | 12/2009 | Larson et al. | 340/945 |
| 2010/0030400 | A1 | | 2/2010 | Komer et al. | |
| 2010/0240988 | A1 | * | 9/2010 | Varga et al. | 600/425 |
| 2010/0295706 | A1 | * | 11/2010 | Mathan et al. | 340/951 |

(Continued)

OTHER PUBLICATIONS

U.S. Appl. No. 13/248,814, filed Sep. 9, 2011, Barber.

*Primary Examiner* — Dmitriy Bolotin
(74) *Attorney, Agent, or Firm* — Angel N. Gerdzhikov; Donna P. Suchy; Daniel M. Barbieri

(57) ABSTRACT

The present disclosure is directed to a method for managing a user interface. The method may include the step of detecting a gaze of a user within a display. The method also includes the step of correlating the gaze of the user to an item displayed on the display. A further step of the method entails receiving an input from the user related to the item.

20 Claims, 6 Drawing Sheets

(56) References Cited

U.S. PATENT DOCUMENTS

| | | | |
|---|---|---|---|
| 2012/0081236 A1* | 4/2012 | Best et al. .................... 340/945 |
| 2012/0272179 A1* | 10/2012 | Stafford ................. G06F 3/012 715/781 |
| 2013/0109478 A1* | 5/2013 | Matsumaru et al. ............ 463/39 |
| 2013/0194164 A1* | 8/2013 | Sugden et al. .................... 345/8 |
| 2013/0214998 A1* | 8/2013 | Andes et al. ..................... 345/8 |
| 2013/0215023 A1* | 8/2013 | Bourret et al. ................ 345/157 |
| 2013/0283213 A1* | 10/2013 | Guendelman ........... G06F 3/017 715/848 |
| 2013/0293488 A1* | 11/2013 | Na et al. ....................... 345/173 |
| 2013/0321265 A1* | 12/2013 | Bychkov et al. .............. 345/156 |
| 2014/0085342 A1* | 3/2014 | Shoemaker .................... 345/672 |
| 2014/0176744 A1* | 6/2014 | Horowitz ................. 348/211.99 |
| 2014/0191946 A1* | 7/2014 | Cho ..................... G02B 27/017 345/156 |
| 2014/0240217 A1* | 8/2014 | Lorenceau .................... 345/156 |
| 2014/0268054 A1* | 9/2014 | Olsson et al. ................. 351/209 |
| 2014/0350942 A1* | 11/2014 | Kady et al. .................... 704/275 |
| 2014/0372944 A1* | 12/2014 | Mulcahy et al. .............. 715/810 |
| 2014/0375680 A1* | 12/2014 | Ackerman ............ G06T 19/006 345/633 |
| 2015/0042552 A1* | 2/2015 | Tsoref .......................... 345/156 |

\* cited by examiner

EYE TRACKING AS A METHOD TO IMPROVE THE USER INTERFACE

TECHNICAL FIELD

The present disclosure generally relates to the field of flight display applications and more particularly to systems and methods that apply eye tracking technology to flight displays and management systems.

BACKGROUND

Existing systems in a flight deck of an aircraft may use several types of user interface control devices. These control devices may require several steps in order to complete a task, which may require significant time and effort for a user.

Some systems in a flight deck may incorporate voice recognition to reduce workload. However, voice recognition systems may not provide accuracy that is sufficiently high for use in certain applications.

Therefore, there exists a need for improved systems and methods for receiving and providing information via an interface on a flight deck.

SUMMARY

The present disclosure is directed to a method for managing a user interface. The method may include the step of detecting a gaze of a user within a display. The method also includes the step of correlating the gaze of the user to an item displayed on the display. A further step of the method entails receiving an input from the user related to the item.

The present disclosure is also directed to a user interface system. The user interface system includes an eye tracking sensor configured to detect a gaze of a user viewing a display. The user interface system also includes a processor in communication with the eye tracking sensor. The processor is configured to receive the gaze of the user and to correlate the gaze to an item displayed on the display. The user interface system also includes an input device in communication with the processor, the input device configured to receive an input from the user related to the item.

The present disclosure is also directed to an input processing method. The method includes the step of receiving a voice command from a user. The method also includes the step of detecting a gaze of the user within a display. The method also includes the step of correlating the gaze of the user to an item displayed on the display. A further step of the method is to confirm the voice command when the item corresponds to the voice command.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Conventional flight decks include several types of user interface control devices. These devices may require the following steps in order to complete a task:

1. Visually identify an item on a display screen (for example, an alert acknowledgement, location on a map for which additional information is sought, a checklist item, etc.);
2. Tactically locate the cursor control device (if hand is not currently on the device);
3. Visually locate the cursor on the display screen;
4. Using fine motor control, manipulate the onscreen cursor to the item;
5. Select the item; and
6. Complete the task related to the item.

The tasks may be completed using any number of conventional input devices, such as a trackball, force sensitive device, displacement joystick, or a mouse. The resulting workload on a user may be substantial.

The use of a touchscreen may help eliminate some of the steps. For instance, a touchscreen interface may eliminate the step of visually locating the cursor on the display screen because the finger is the cursor device in a touchscreen. However, the user may still have to complete all of the other steps.

One example where the workload may be substantial is when a user is manipulating a map and wants to zoom in our out, or when the user is working on a checklist. These tasks may require the following actions:

1. Change the range of the map to get the object into view (using the range knob);
2. Pan the map to the center of the map (using a cursor control device or a joystick); and
3. Change the range of the map to see the object (using the range knob).

In this example, the interface requires multiple controls (cursor control device, range knob), further contributing to the user's workload.

Another tool that may be used to reduce workload within the flight deck is voice recognition technology. Some voice recognition leading algorithms use both context (what is the user doing) and statistical modeling to provide improved recognition rates. The effectiveness of voice recognition as a tool within the flight deck depends on the accuracy of the technology. Some voice recognition methods have had partial success, but in order to attain a tool capable of 'natural language', alternate voice recognition context generators are required.

Figure 1:
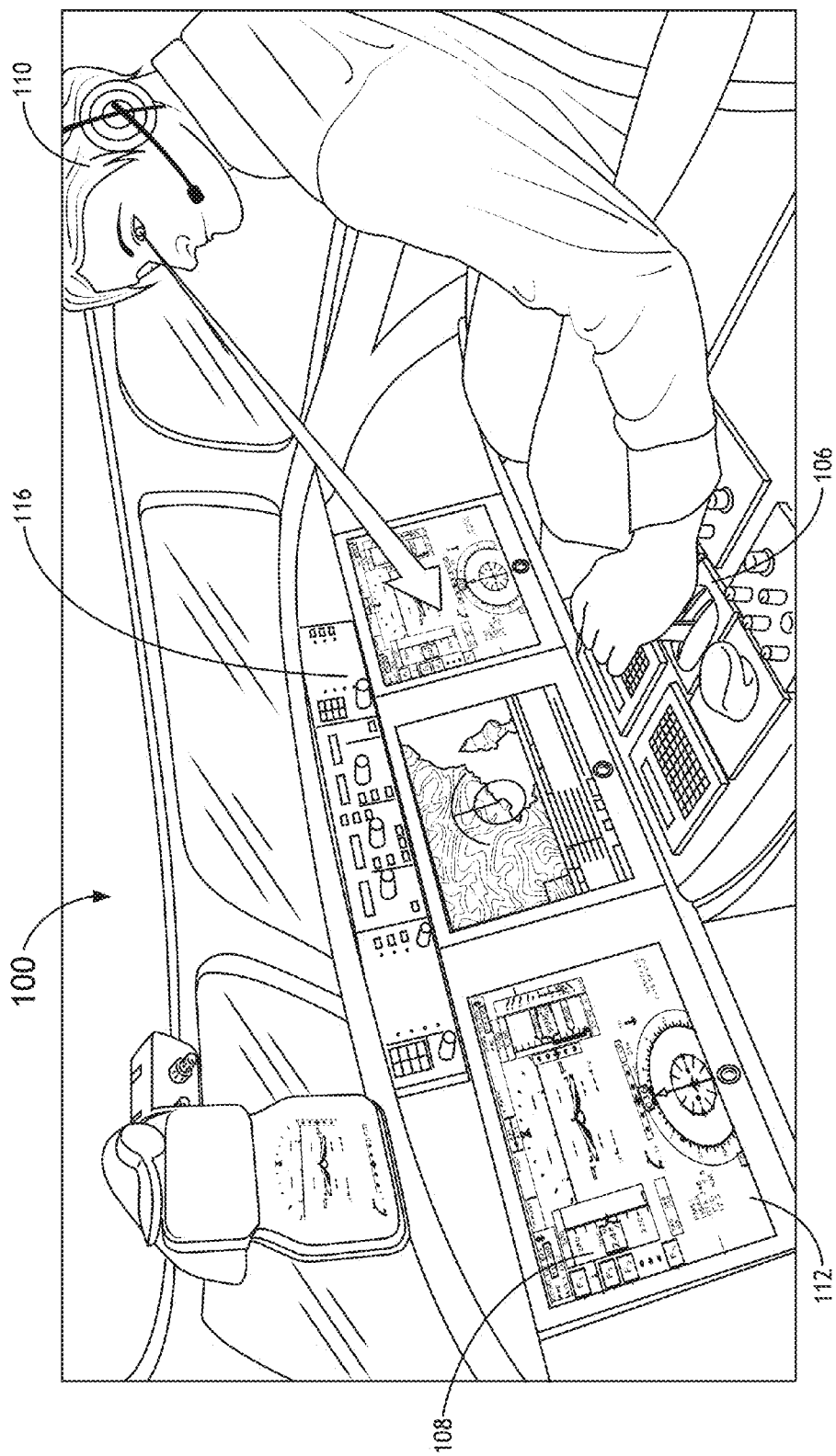
FIG. 1 is a view of a cockpit including the user interface system.
Figure 2:
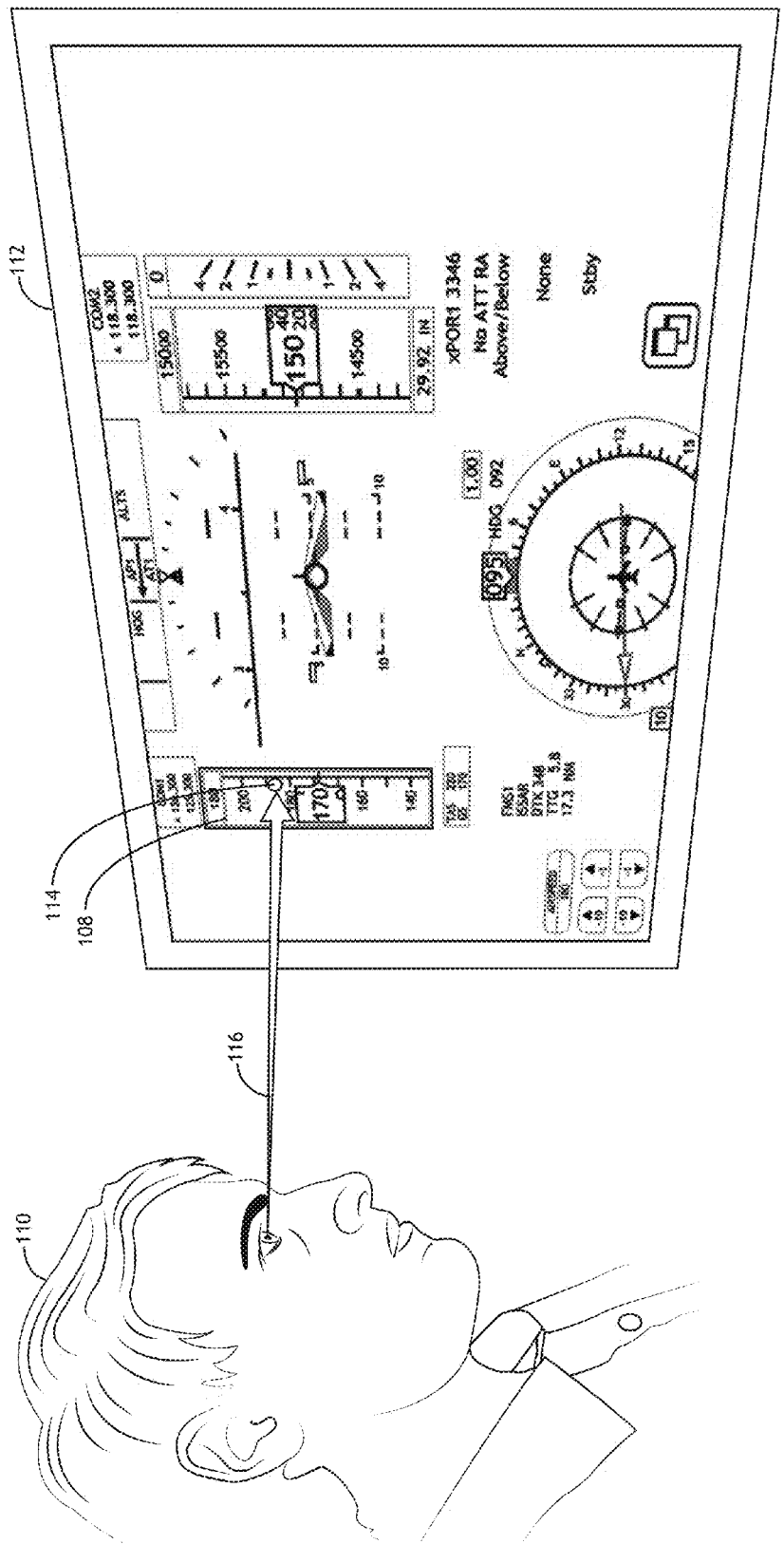
FIG. 2 is an example implementation of user interface system in a flight display.
Figure 3:
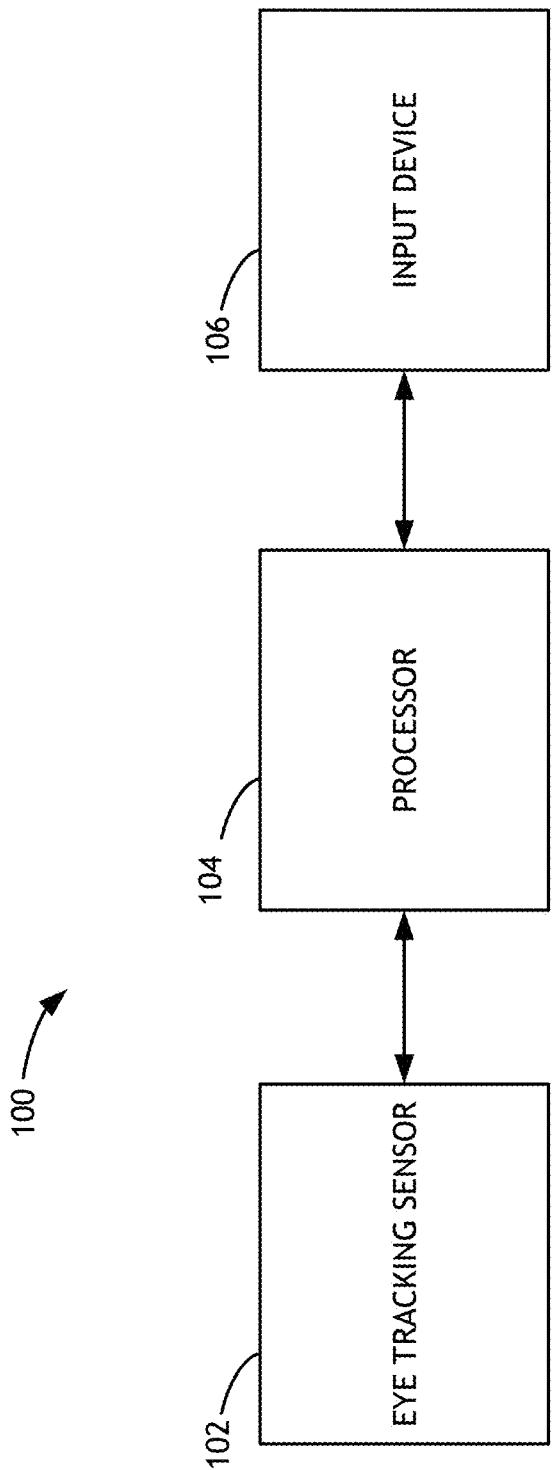
FIG. 3 is a diagram of a user interface system.

Embodiments of the present disclosure relate to systems and methods for using eye tracking in the user interface on a flight deck. Referring generally to FIGS. 1-3, a user interface system 100 is provided. Referring specifically to FIG. 3, the user interface system 100 includes an eye tracking sensor 102 configured to detect a current gaze of a user viewing a display. The eye tracking sensor 102 is in communication with a processor 104. The processor 104 is configured to receive the current gaze of the user from the eye tracking sensor 102. The processor 104 is also configured to correlate the gaze of the user to an item displayed on the display. The processor 104 is in communication with an input device 106. The input device 106 is configured to receive an input from the user related to the item. Using the user interface system 100, eye tracking may support the user to complete a task associated with the item.

An example implementation of the system 100 is provided in FIGS. 1 and 2. The user 110 is currently viewing a display 112 within a cockpit of an aircraft. The user 110 may include a pilot in one example, a driver in another example, or other user. The eye tracking sensor may detect the gaze 116 of the user 110 at a location 114 in the display 112. The eye tracking sensor may be embedded within the display 112, or may be located external to the display 112. The processor correlates the location 114 of the gaze 116 to an item 108 presented on the display 112. In the example shown in FIG. 2, the item is an airspeed controller for the aircraft. In other examples, the item 108 may relate to any application or information presented on the display 112.

FIG. 1 also includes an example implementation of the input device 106 configured to receive input from the user 110. The input may be related to the item 108. For example, when the item 108 is the airspeed controller for the aircraft, the user 110 may focus his gaze 116 on the airspeed controller, and then change the speed setting using the input device 106.

The eye tracking sensor 102 may be suitable for implementation in an aircraft. The eye tracking sensor 102 may include a single sensor or a plurality of sensors. The eye tracking sensor 102 may include a non-contact system for measuring eye motion in one embodiment. In another embodiment, the eye tracking sensor 102 includes an attachment to the eye such as a contact lens for measuring the movement of the eye. In another embodiment, the eye tracking sensor 102 is incorporated within an existing helmet or mask system used by the user, or within a head up display. In another embodiment, the eye tracking sensor 102 includes a sensor placed around the eyes to measure movement. In another embodiment, the eye tracking sensor 102 may be partially or completely embedded within the display 112 or within other sub systems on the aircraft. The eye tracking sensor 102 may also be located adjacent to or near a display on the aircraft. In addition, the eye tracking sensor 102 may be configured to detect the user's gaze within a single display or within two or more different displays. It is understood that the type of eye tracking sensor 102 is not limited to the examples described and any suitable technology for detecting a gaze of a user may be used with the user interface system 100.

The eye tracking sensor 102 may include a processor in one embodiment. In one embodiment, the processor for the eye tracking sensor 102 be incorporated as part of a separate eye tracking system in communication with the processor 104. In another embodiment, the processor for the eye tracking sensor 102 may be part of the processor 104 of the user interface system 100.

The processor 104 may be in communication with the eye tracking sensor 102 and the input device 106 as shown in FIG. 3. The processor is configured to receive the current view of the user from the eye tracking sensor 102. The processor 104 may also be in communication with the input device 106. The processor 104 is configured to receive the gaze of the user and to correlate the gaze of the user to an item displayed on the display. The processor 104 may be further configured to highlight the item 108. Highlighting the item may include changing the appearance of the item, including changing the color of the item or making the item bolder or brighter. Highlighting the item may also include making the item blink, flash, or otherwise move. Any means of making the item more noticeable to the user may be considered highlighting the item.

The processor 104 may be further configured to adjust a location of the item 108 within the display 112, or to otherwise modify or change information related to the item 108. The change may be based on an input received through the input device 106, or another factor such as the type of application currently running on the display 112. For example, if the user is viewing a map and fixes his gaze 116 on a particular location on the map, the processor 104 may be configured to center the map on the location corresponding to the user's gaze. The processor 104 may be further configured to adjust information on the display 112 based on the input received through the input device 106. In this example, the user may use the input device 106 to zoom in or zoom out on the location of the user's gaze.

In another example, the user may be viewing a checklist or other pageable or scrollable list containing any type of data and the processor 104 may be configured to adjust the position of the list or an item on the list in the display 112. If the user is viewing the list and moves his gaze 116 towards the bottom of the list, the processor 106 may be configured to advance the checklist to move the item corresponding to the user's gaze to the top of the checklist. Similarly, the gaze 116 may be used to advance or move an item upwards or to the left or right in the checklist or any other type of pageable or scrollable list. An input from the user may be required in order to advance the checklist. The processor 106 may be further configured to complete items on the checklist based on input received from the user through the input device 106.

In another example, the user interface system 100 may be used to review and complete the Electronic Checklist for the aircraft. The processor 104 may be configured for running Electronic Checklist software and is further in communication with on board and off board systems for completing the Electronic Checklist. The user views the display 112 that shows the Electronic Checklist and the eye tracking sensor 102 detects the gaze of the user on the display 112. The user may scroll up and down the page by adjusting his gaze and as detected by the eye tracking sensor 102 and providing an input through the input device 106.

In another example, the user interface system 100 may be used to change data within the flight deck. For example, the user may target his gaze 116 to an indexable value such as heading, speed, or the like. The user may then use the input device 116 to increment/decrement the value. In one example this may be performed by rotating a thumbwheel of the input device 106. The user may also use a voice command to increment/decrement the value.

In one embodiment, the user interface system 100 may restrict automatic scrolling or other automatic cursor events based upon gaze 116 due to the possibility of problems resulting from the unintentional nature of eye movement. Similarly, a positive user action (for example, a user input through the input device 106) may be coupled with eye gaze actions in order to execute any change. In one embodiment, a positive user action may be required in order to execute any change. In another embodiment, a positive user action may be required to execute critical changes only. Whether a positive user action is required to execute a change is generally predetermined depending on the circumstances and the configuration of the user interface system 100. For example, in one embodiment a positive user action may be required in order to permit panning using the user interface system 100, as this may be considered a critical change. In another embodiment, panning may be permitted by the user interface system 100 without requiring a positive user action.

The processor 104 may include any suitable computer processor. The processor 104 may be implemented as a separate system on the flight deck, or incorporated within an existing system on the aircraft, such as the Flight Management System. The processor 104 may be in communication with other systems for the aircraft, including both on board and off board communication systems.

The user interface system 100 may be configured to operate with existing display systems for the aircraft. The display may include a display device for displaying graphical, video, photographic, and textual information to a user. For example, the display may be a screen, multi-function display, monitor, cathode ray tube, liquid crystal display, head up display, head down display, projector, plasma, flat panel or any other type of display suitable for a flight deck. Similarly, the display may include a single display or a plurality of displays located in the flight deck.

The input device 106 is configured to receive input from the user. The input may include an acknowledgement, a response, a request, or a change to information related to the item 108 corresponding to the user's gaze 116. The user may provide input to the system 100 via any suitable input device 106. For example, the user may provide input via tactile feedback or haptic technology, such as a button, a touch screen, a multi-touch surface, a pressure-triggered screen with a stylus, a keyboard, mouse, a haptic device incorporating a tactile sensor, or any other suitable device for receiving inputs from a user. The input device 106 may also include a voice recognition system or device. The input device 106 may include an existing input device 106 for the aircraft, or a new input device 106. The input device 106 may also combine different input device types, such as a haptic system and a voice recognition system, or multiple types of haptic systems or the like. The input device 106 may be located on the user controls allowing rapid access for the user.

The eye tracking sensor 102, processor 104, and input device 106 may be separate sub-systems or may be incorporated into a single system. Similarly, each of the eye tracking sensor 102, processor 104, and input device 106 may be incorporated within existing systems and sub systems for the aircraft.

In one embodiment, the user interface system 100 may be used with the Flight Management System of the aircraft. For example, the user may tab through pages of the Flight Management System by looking at specific fields within the Flight Management System. The user interface system 100 may also be incorporated as part of a goal-based Flight Management System. For example, the user interface system 100 may be useful in meeting the goal of reducing user workload. Similarly, the user interface system 100 may be useful in other goal-based Flight Management System applications. The user interface system 100 may also be configured as part of a user driven interface in one embodiment.

The user interface system 100 may be used on a variety of aircraft, such as civilian aircraft, military aircraft, helicopters, regional jets, business jets, and other aircraft. The user interface system 100 may also be useful in other vehicles or contexts where it is useful to interface with an operator or user via eye tracking.

Figure 5:
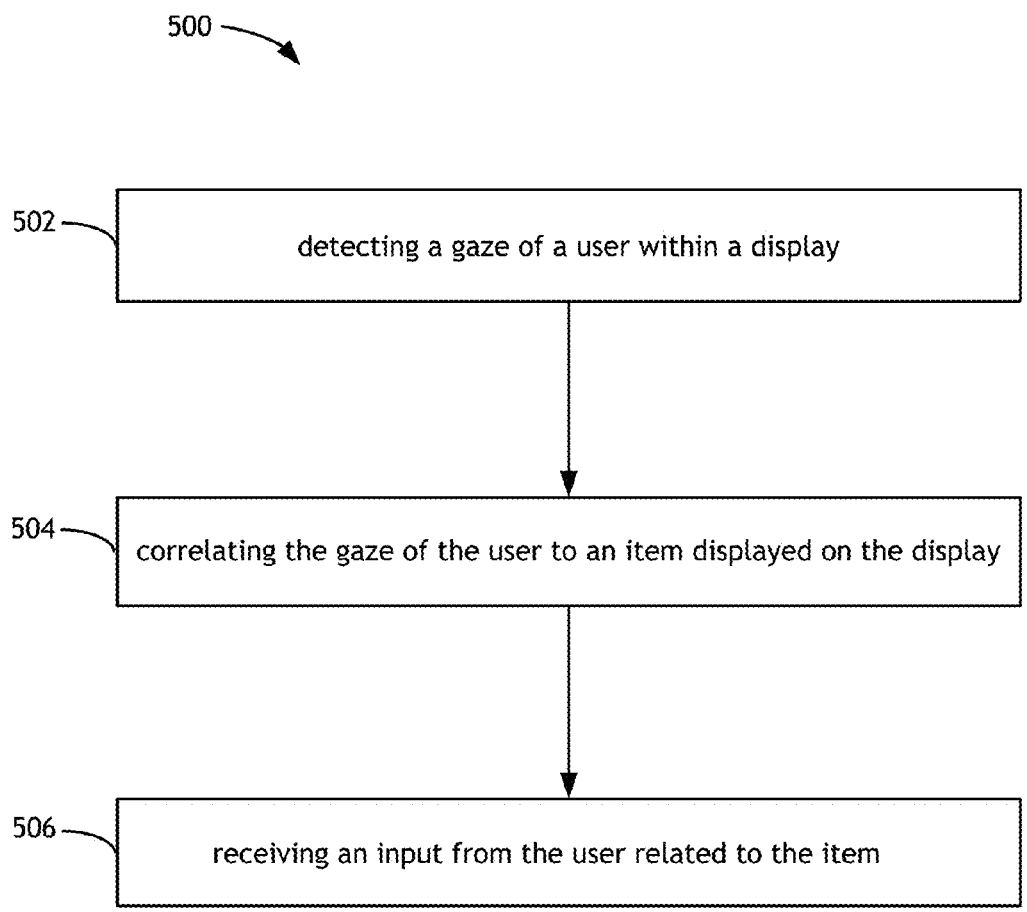
FIG. 5 is a flow diagram of a method for managing a user interface.

The present disclosure is also directed to a method 500 for managing a user interface as shown in FIG. 5. The method 500 may be executed by the user interface system 100, or another suitable system. The method 500 may include the step of detecting a gaze of a user within a display 502. The method 500 may also include the step of correlating the gaze of the user to an item displayed on the display 504. The method 500 also includes the step of receiving an input from the user related to the item 506.

In embodiments, the method 500 may include additional steps. For example, a further step of the method 500 may include highlighting the item on the display. Another step of the method 500 may include adjusting a position of the item on the display. For example, the item may include a location on a map, and adjusting a position of the item on the display may include centering the location on the map on a center of the display. In another example, the item may include a checklist and adjusting a position of the item on the display may include moving the checklist up or down, or paging through the checklist, or otherwise placing the checklist or a particular item on the checklist in a more convenient location.

The step of adjusting a position of the item on the display may occur automatically (for example, when using a mapping application, the display may automatically center on the location the user is viewing). The step of adjusting a position of the item on the display may also occur in response to a user input. For example, in a mapping application the user may provide input in order to zoom in or zoom out of a view on the map.

The method 500 may be useful by allowing a user to use gaze to drive a center point. For example, the user's gaze may be used to determine a center point on a map. Similarly, a user may use their gaze to adjust the location of the map, for example by looking at a side area of the map or a different location of the map, the map may pan or move in the direction of the gaze. In addition, the user's gaze may be used to determine a zoom center point when the user wishes to zoom in on the map. For example, the view of the map may center on the current gaze of the user. The user may then provide input (for example, through an input device) to increment or de-increment the zoom on the map.

Figure 4:
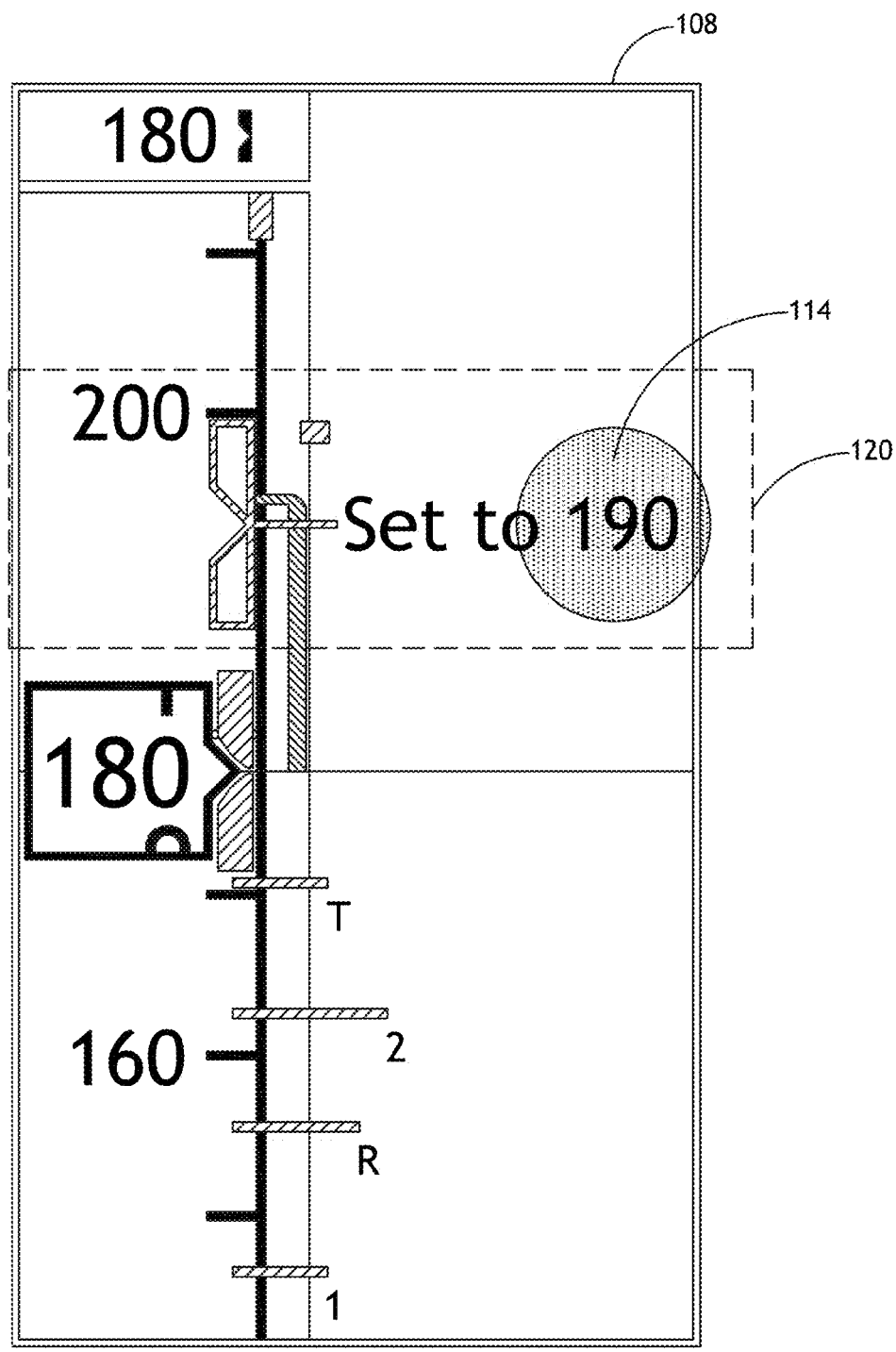
FIG. 4 is an example of a correlation of a user's gaze to an airspeed control item within a display.

The method 500 may also support the use of voice recognition by providing context to a voice command. In this embodiment, the step of receiving an input from the user related to the item 506 includes receiving a voice command from the user. A further step of the method 500 may include determining a meaning of the voice command based on the voice command and the item. For example, if a user wishes to increase the speed of the aircraft, he may look at the airspeed control display. Using the method 500, his gaze will be detected and correlated to an airspeed control item within the display, as shown in FIG. 4 where the location 114 of the user's gaze is within the airspeed control display (item 108) and more particularly in the area of a speed of 190. After looking at the item he wishes to change, the user may issue a voice command such as "accelerate to 190." The voice command may be issued either simultaneously upon gazing/looking at the item, or may be issued after. The act of looking at a feature within the display offers the voice recognition system context. In this example, airspeed will be rated higher than most other potential commands because of the context provided by the user's gaze. Based on this context, less likely words may be filtered out by the voice recognition system.

The additional step of the method 500 of determining a meaning of the voice command based on at least the voice command and the item may be completed by a voice recognition system. Similarly, determining the meaning of the voice command may be based on additional factors.

In one embodiment, additional steps may be required to complete the task associated with the voice command. For example, an additional step of the method 500 may include receiving an input from the user related to the voice command. This input may be provided in order to confirm the voice command. Whether this additional step is required will depend on many factors, such as the type of voice command. For example, critical changes such as changes to the flight plan may require an additional confirmation step before they can be executed.

Figure 6:
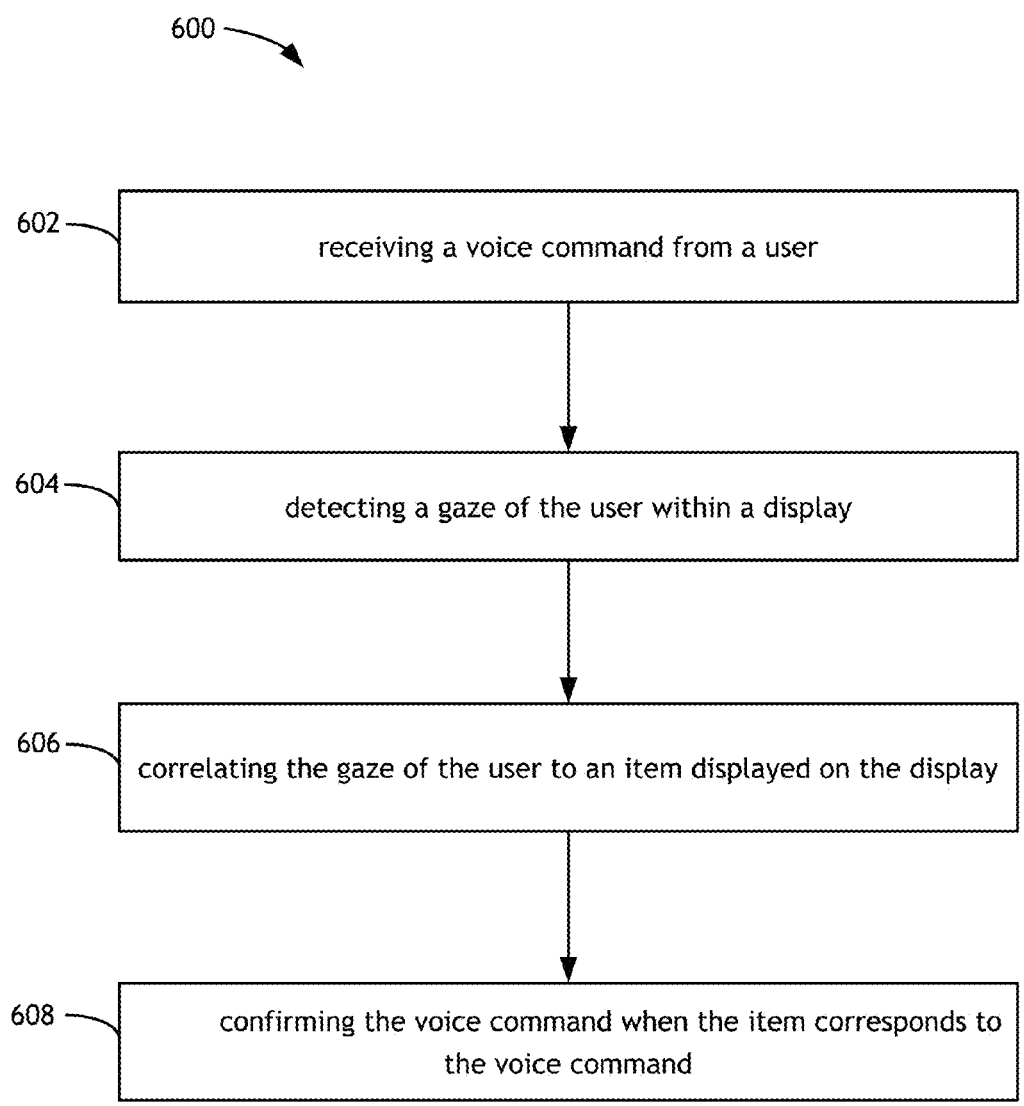
FIG. 6 is a flow diagram of an input processing method.

The present disclosure is also directed to an input processing method 600 shown in FIG. 6. The method 600 may be used to confirm a voice command based on the gaze of a user. The method 600 includes the step of receiving a voice command from a user 602. The method 600 also includes the step of detecting a gaze of the user within the display 604 and correlating the gaze of the user to an item displayed on the display 606. The method also includes the step of confirming the voice command when the item corresponds to the voice command 608. For example, if the user wishes to change a critical function of the aircraft such as the flight path, he may verbally issue an acceleration command, as shown in the example of FIG. 4. The user may then direct his gaze to the display relating to acceleration and more particularly to a location within the display corresponding to the desired speed. If the user's gaze within the display corresponds to the voice command, the voice command will be confirmed. Similarly, the voice command may be issued after the user directs his gaze to the desired speed. Determining if the user's gaze corresponds to the voice command may entail determining whether the user's gaze falls within a predetermined confirmation area 120, as shown in FIG. 4. The predetermined confirmation area 120 may be highlighted for the user in one embodiment, as shown in FIG. 4. In another embodiment, the confirmation area 120 will not be displayed to the user, but his gaze must still focus within the confirmation area 120 in order for the voice command to be confirmed.

The method 600 may be useful in fulfilling regulatory requirements that relate to the use of voice recognition in the context of avionics. For example, regulations may require a secondary confirmation of a critical command issued through a voice recognition system. The method 600 and user interface system 100 may be useful for providing this confirmation.

The systems and methods of the present disclosure may provide several advantages. First, the systems and methods of the present disclosure may reduce a user's workload by reducing the number of steps required to alter an item or make a change within an application on an aircraft system. The systems and methods of the present disclosure may also support simplification of aircraft interfaces by reducing the number of input devices and controls, including control systems that may be imperfect or difficult to use such as a mouse or a trackball cursor control device. The systems and methods may also facilitate reduced workloads when zooming in or out of a map by reducing the need for two control systems.

In addition, the use of voice recognition and eye tracking in some of the systems and methods of the present disclosure may support accuracy in voice recognition systems. Similarly, the use of voice recognition may be useful in providing a secondary confirmation step to perform a critical function. This may assist in compliance with regulatory requirements.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

What is claimed is:

1. A method for managing a user interface, comprising:
   detecting a gaze of a user within a display via an eye tracking sensor, the eye tracking sensor measuring eye movement or eye motion;
   correlating the gaze of the user to a first location associated with an item displayed on the display;
   receiving an input from the user related to adjusting the item relative to a second location or adjusting a function associated with the item relative to the second location; and
   communicating the input to at least one of: an on board aircraft communication system and an off board aircraft communication system, wherein the adjusting of the item or the adjusting of the function is only performed if the input and the gaze correspond to the second location associated with the item displayed on the display.

2. The method as claimed in claim 1, wherein receiving an input from the user related to adjusting the item relative to the second location or adjusting the function associated with the item relative to the second location includes receiving an input via at least one of: a voice recognition system, a tactile feedback system, a haptic technology system, a touch screen, a multi-touch surface, a pressure-triggered screen with a stylus, a joystick, a keyboard, a cursor control panel, or a mouse.

3. The method as claimed in claim 1, wherein the display includes at least one of a Head Up display or a head mounted display.

4. The method as claimed in claim 1, wherein the method is implemented on a goal based Flight Management System.

5. The method as claimed in claim 1, further comprising: highlighting the item on the display.

6. The method as claimed in claim 1, further comprising: adjusting a position of the item on the display.

7. The method as claimed in claim 6, wherein the first location is a location on a map and the second location is a center location on the display, and adjusting the position of the item on the display includes centering the first location to the second location on the display, and wherein receiving the input from the user related to adjusting the item relative to the second location includes at least one of: decrementing an area of the first location via a zoom in request or incrementing the area of the first location via a zoom out request.

8. The method as claimed in claim 6, wherein the input is a voice command, wherein the second location is a location corresponding to a desired speed and adjusting the position of the item on the display includes adjusting a current speed to the desired speed only after the voice command is confirmed, wherein the voice command is confirmed by determining the gaze of the user is within a confirmation area associated with the second location corresponding to the desired speed, and wherein the voice command includes an acceleration command.

9. The method as claimed in claim 6, wherein adjusting a position of the item on the display includes at least one of: scrolling through a list or paging through a list.

10. The method as claimed in claim 1, wherein the receiving an input from the user related to adjusting the item relative to the second location or adjusting the function associated with the item relative to the second location comprises receiving an additional input related to the voice command from the user.

11. The method as claimed in claim 1, further comprising:
determining a meaning of a voice command based on at least: the voice command and the item.

12. A user interface system, comprising:
an eye tracking sensor, the eye tracking sensor configured to detect a gaze of a user viewing a display and to measure eye movement or eye motion;
a processor in communication with the eye tracking sensor and in communication with at least one of an on board aircraft communication system and an off board aircraft communication system, the processor configured to receive the gaze of the user, the processor further configured to correlate the gaze of the user to a first area associated with an item displayed on the display; and
an input device, the input device in communication with the processor, the input device configured to receive an input from the user related to adjusting the item relative to a second area or adjusting a function associated with the item relative to the second area, wherein the adjusting the item or the adjusting the function associated with the item is only performed by the processor if the input and the gaze of the user correspond to the second area associated with the item.

13. The system as claimed in claim 12, wherein the input is a voice command, wherein the input device is further configured to receive a second input related to the voice command from the user, and wherein the input device includes a voice recognition system and at least one of: a tactile feedback system, a haptic technology system, a touch screen, a multi-touch surface, a pressure-triggered screen with a stylus, a keyboard, or a mouse.

14. The system as claimed in claim 12, wherein the eye tracking sensor includes a non-contact eye tracking sensor for tracking the eye motion or a contact lens for tracking the eye movement.

15. The system as claimed in claim 12, wherein the display includes at least one of: a head up display or a helmet mounted display.

16. The system as claimed in claim 12, wherein the second area includes a confirmation area, and wherein the processor is further configured to highlight the item or highlight the confirmation area.

17. The system as claimed in claim 12, wherein the processor is further configured to adjust a location of the item relative to the second area within the display.

18. An input processing method, comprising:
receiving a voice command from a user related to an item displayed on the display;
detecting a gaze of the user within the display;
measuring an eye movement;
correlating the gaze of the user to a first location associated with the item displayed on the display according to the eye movement; and
confirming the voice command and (i) adjusting the item relative to a second location or (ii) adjusting a function associated with the item relative to the second location when the second location associated with the item and the gaze correspond to the voice command.

19. The input processing method as claimed in claim 18, further comprising:
determining a meaning of the voice command based on at least: the voice command and the gaze of the user within the display.

20. The input processing method as claimed in claim 18, wherein confirming the voice command and (i) adjusting the item relative to the second location, or (ii) adjusting the function associated with the item relative to the second location when the second location associated with the item and the gaze correspond to the voice command includes determining if the gaze of the user falls within a predetermined confirmation area.

\* \* \* \* \*